United States Patent
Nakamura

(10) Patent No.: US 6,917,968 B2
(45) Date of Patent: Jul. 12, 2005

(54) SYSTEM FOR PROVIDING LOCATION INFORMATION FROM A REMOTE TERMINAL AND DISPLAYING ON A MAP DISPLAY AS A URL

(75) Inventor: Shuichi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,404

(22) Filed: Sep. 28, 1998

(65) Prior Publication Data

US 2003/0140136 A1 Jul. 24, 2003

(30) Foreign Application Priority Data

Sep. 30, 1997 (JP) .............................................. 9-267366
Sep. 3, 1998 (JP) ........................................... 10-250017

(51) Int. Cl.⁷ .............................................. G06F 15/16
(52) U.S. Cl. ........................ 709/217; 709/218; 709/219; 709/224; 709/225; 455/456.1; 455/456.6; 455/457; 701/208
(58) Field of Search ................................. 709/217, 218, 709/219, 224, 225; 455/456.1, 456.6, 457; 340/989, 990, 992; 345/850, 851; 701/207, 208, 213

(56) References Cited

U.S. PATENT DOCUMENTS

| | | | | |
|---|---|---|---|---|
| 5,299,132 A | * | 3/1994 | Wortham | 340/990 |
| 5,844,473 A | * | 12/1998 | Kaman | 340/439 |
| 5,902,351 A | * | 5/1999 | Streit et al. | 340/990 |
| 5,926,116 A | * | 7/1999 | Kitano et al. | 340/988 |
| 5,928,306 A | * | 7/1999 | France et al. | 701/207 |
| 6,068,188 A | * | 5/2000 | Knowles | 235/462.01 |
| 6,131,067 A | * | 10/2000 | Girerd et al. | 340/989 |
| 6,138,150 A | * | 10/2000 | Nichols et al. | 345/835 |
| 6,199,045 B1 | * | 3/2001 | Giniger et al. | 340/990 |

FOREIGN PATENT DOCUMENTS

| | | | | |
|---|---|---|---|---|
| GB | WO 97/07467 | * | 2/1997 | ........... G06F/17/30 |
| JP | 8-037682 | | 2/1996 | |
| JP | 9-153054 | | 6/1997 | |
| JP | 9-166450 | | 6/1997 | |
| JP | 9-178833 | | 7/1997 | |
| JP | 9-231244 | | 9/1997 | |
| WO | WO 97/07467 | | 2/1997 | |
| WO | WO 97/32439 | | 9/1997 | |

* cited by examiner

Primary Examiner—Glenton B. Burgess
Assistant Examiner—Kevin Parton
(74) Attorney, Agent, or Firm—Fitzpatrick, Cella, Harper & Scinto

(57) ABSTRACT

Status information concerning a particular terminal can be provided through a simple arrangement while utilizing a general-purpose network. A terminal which generates status information has a status sensing unit for sensing the status of the terminal or of an input/output unit. Information representing the status sensed is converted to text-format data and is transferred to a server on a network such as the Internet at predetermined time intervals by a unit for generating transmitted data. The data is stored as a file. An information display terminal uses a browser to read the data out of the server and display the data.

4 Claims, 15 Drawing Sheets

FIG. 15

```
< HTML >
< IMG SRC = " E13515N4015.gif " usemap = " # mapfile " >
< MAP NAME = " mapfile " >
< AREA SHAPE = " rect " COORDS = " 492,92 507,107 " HREF = " http://wwwserver20a.abc.co.jp/input10a/input.abc " >
< AREA SHAPE = " rect " COORDS = " 292,492 307,507 " HREF = " http://wwwserver20a.abc.co.jp/input11a/input.abc " >
< MAP >
< / HTML >
```

SYSTEM FOR PROVIDING LOCATION INFORMATION FROM A REMOTE TERMINAL AND DISPLAYING ON A MAP DISPLAY AS A URL

BACKGROUND OF THE INVENTION

This invention relates to a status information providing system, apparatus, method and storage medium for providing a terminal with information via a general-purpose network.

There are various methods of entering (registering) the status information of a plurality of input/output units in a database device and utilizing (acquiring) the status information that has been registered.

One example of such a method involves communicating with a database via a dedicated input communication port by client-server-type communication, registering the status information of an input/output unit, and acquiring data, which has been registered in the database, via a dedicated output communication port.

When it is attempted to construct a client-server-type communication system utilizing a dedicated communication port in a case where the status information of a plurality of input/output ports is entered (registered) in a database and status information that has been registered is utilized, dedicated input/output communication ports and a dedicated client or server in which a dedicated communication format has been set must be created individually. Further, the status information thus registered can be utilized only by a dedicated client. In order to use this information for another purpose, a dedicated client must be created separately for this purpose.

The following methods have been proposed or implemented in order to specify the input/output information of a plurality of input/output terminals as information resources utilizable on a network:

A typical scheme that has been proposed is the Uniform Resource Identifier (URI) used in HyperText Markup Language. A subset thereof in widespread use is the Universal Resource Locator (URL). An URL is defined by RFC 1808. An URL is implemented in such a manner that a resource that can be utilized (referred to) on a network is capable of being specified in the following format:

scheme://host:port/path;parameter?query#fragment

The scheme represents the protocol utilized; the host represents the host name or IP address; the port represents the port number utilized by the protocol server; and the path represents the path and file name for referring to the resource on the server. The parameter represents a specific parameter necessary for a resource; the query represents a query character string for a CGI (Common Gateway Interface); and the fragment represents reference to a subset of a resource.

In a case where selection of an information resource specified by an URL is performed using a browser or the like, two techniques are available. One technique involves inputting the URL to the browser. The other technique involves selecting an information resource without inputting an URL, specifically (1) a method of creating a web page in which hyperlinks specifying the URLs of information resources have been established, and (2) a method of creating a web page in which hyperlinks specifying the URLs of information resources have been established utilizing a registration-type web page search engine, in which the party that transmits the information is made to register the URL of the information resource.

In a case where a specific information resource is selected from input/output information resources supplied by a plurality of input/output terminals by an URL or the like according to the prior art, it is necessary that the web page on which the hyperlink specifying the information resource is set be created by the information transmitting party in advance or be registered on a registration-type web page by the information transmitting party.

Method (1) requires that a web page be created by a manual operation. With method (2), a registration operation is performed manually, registration takes time and information relating to input/output information resources cannot be updated in real-time.

SUMMARY OF THE INVENTION

Accordingly, an object of the present invention is to provide a status information providing system, apparatus, method and storage medium for providing status information concerning a particular terminal through a simple arrangement while utilizing a general-purpose network.

According to the present invention, the foregoing object is attained by providing a status information providing system for sensing the status of a particular terminal via a network of a general-purpose protocol and outputting information indicative of the sensed status to a prescribed output terminal, wherein the particular terminal is provided with status sensing means for sensing its own status or status of a prescribed device located within the terminal itself, and transmitting means for transferring information, which relates to the status sensed, to a prescribed server on the network, and storing this information in storage means provided in the server; and the output terminal includes readout means for reading information out of the storage means of the server, and output means for producing an output in accordance with the information read out of the storage means.

Another object of the present invention is to provide an information providing apparatus, system, method and storage medium through which information, which is generated by a desired one of a plurality of information generating terminals, can be verified in real-time.

According to the present invention, the foregoing object is attained by providing an information providing apparatus using a general-purpose protocol for allotting input information, which has been entered at a plurality of information generating terminals connected to a network, to a client connected to the network, comprising terminal status storage means for receiving data sent from the plurality of information generating terminals at predetermined time intervals, and storing the data in a storage unit provided for each information generating terminal; first transmitting means for transmitting viewing information concerning information generating terminals to a client in order to make it possible to select any object terminal for which data has been stored; and second transmitting means for transmitting, to the client, information for receiving input information of the information generating terminal, which has been selected by the client, in such a manner that the client can receive information that has been entered from an input device possessing the information generating terminal that has been selected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a diagram showing the content of viewing information transmitted by a server according to the third embodiment.

DESCRIPTION OF THE PREFERRED EMBODIMENTS

Embodiments of the present invention will now be described in detail with reference to the drawings.

Figure 1:
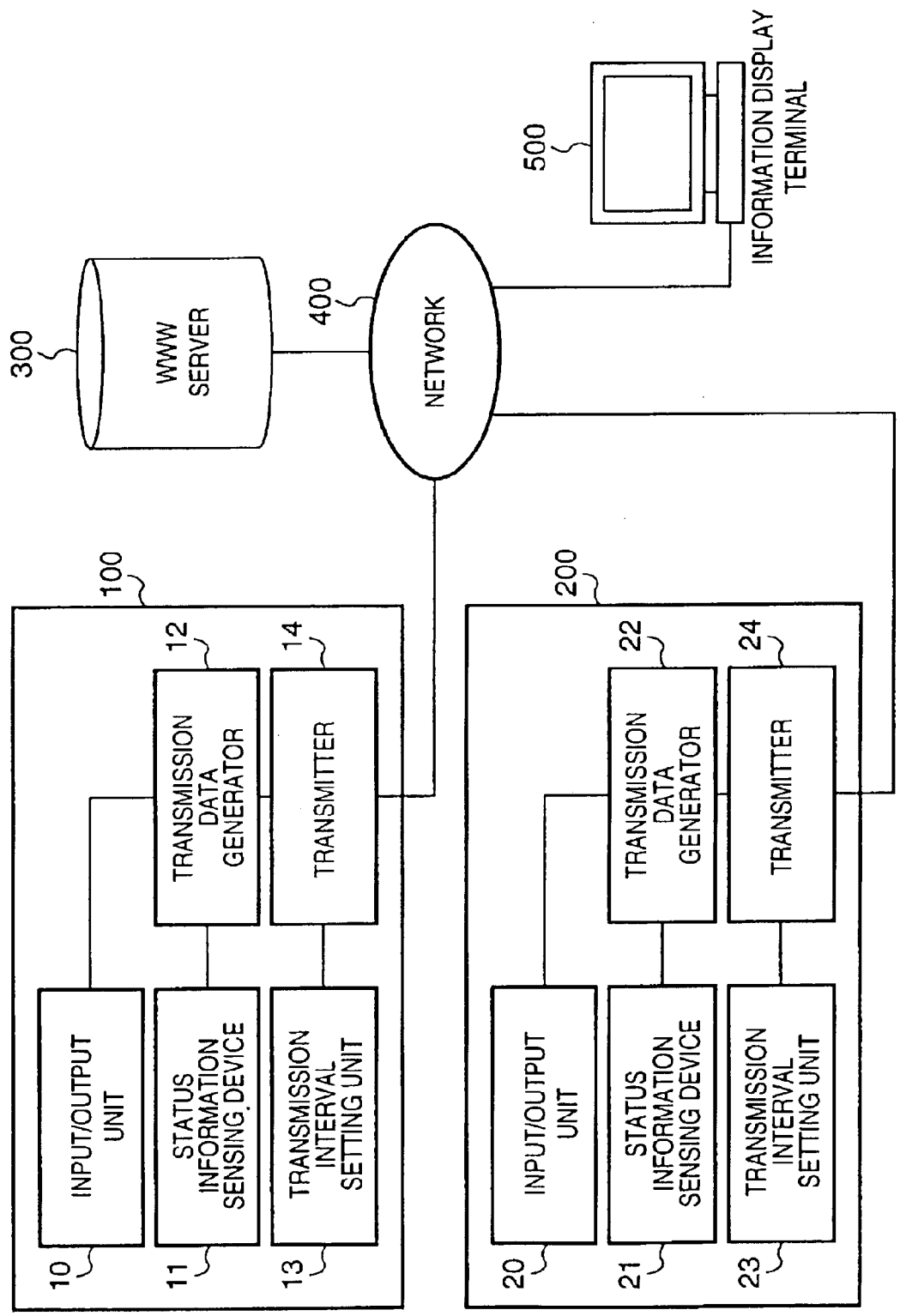
FIG. 1 is a block diagram showing the configuration of a system according to a mode of practicing the present invention.

FIG. 1 is a block diagram showing the configuration of a system for practicing the present invention.

As shown in FIG. 1, the system includes terminals 100, 200 whose status is to be sensed in this mode of practicing the invention. By way of example, the terminals may be provided on a moving body such as an automobile. A general-purpose network 400 in this mode of practicing the invention is The Internet. A WWW (World-Wide Web) server 300 is provided on the network 400, to which an information display terminal 500 is connected.

As the terminals 100, 200 are substantially the same in construction, the terminal 100 will be described here.

The terminal 100 includes an input/output unit 10 and a status information sensing device 11 for sensing the status of the terminal 100 and outputting status information data capable of being utilized by a computer. A transmission data generator 12 generates transmission data, the format of which is in compliance with the HTTP (HyperText Transfer Protocol) 1.0 transmission format, from information obtained from the input/output unit 10 and the status information data sensed by the status information sensing device 11. A transmitter 14 is capable of transmitting data from the transmission data generator 12 via the network 400 as URL information that specifies terminal 100. A transmission interval setting unit 13 sets the time intervals at which a transmitter 14 transmits.

Figure 2:
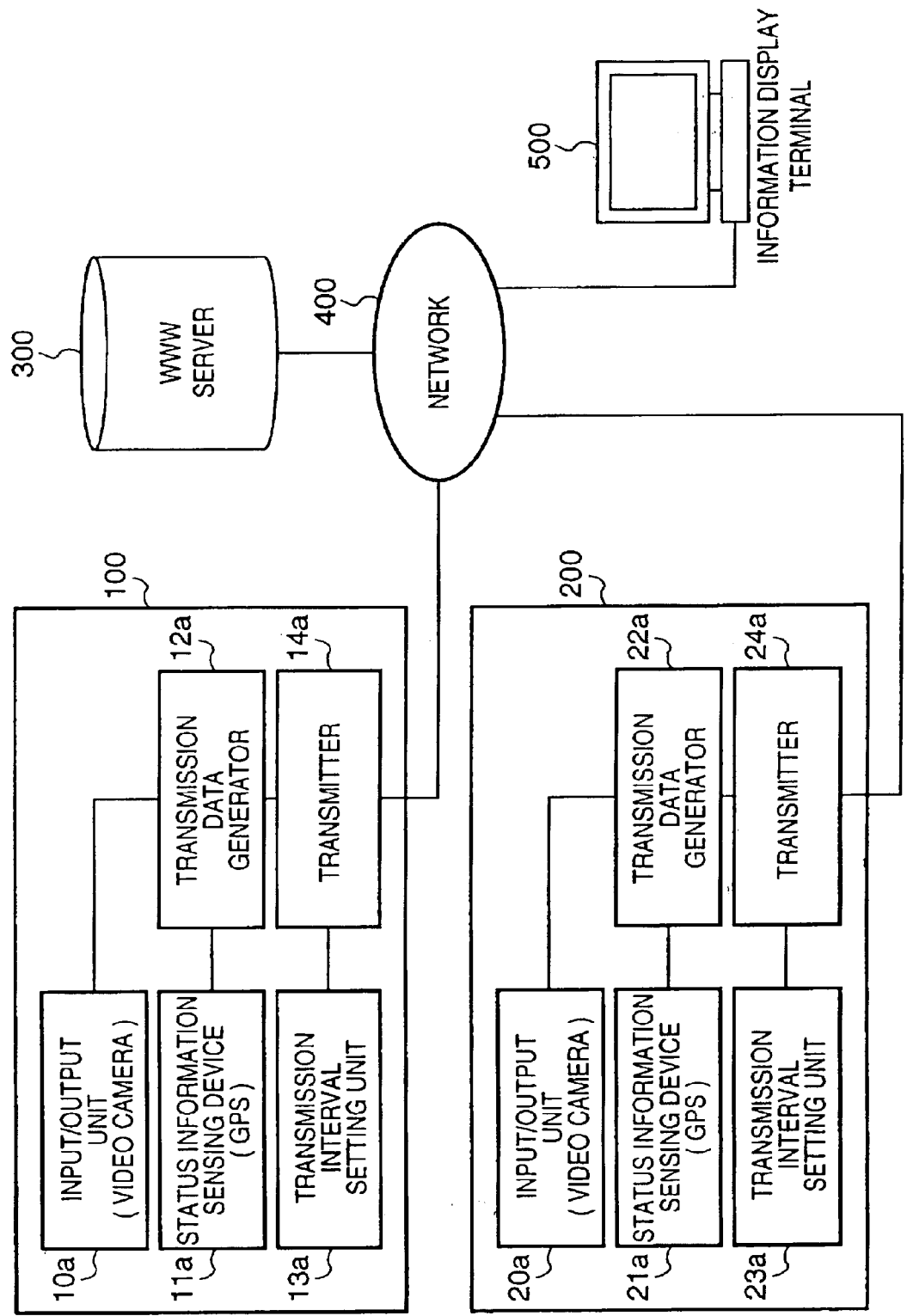
FIG. 2 is a system block diagram illustrating a first embodiment.

FIG. 2 is a diagram showing a specific example of application of the system illustrated in FIG. 1. Components 10a–14a and 20a–24a in FIG. 2 correspond to the components 10–14 and 20–24, respectively, shown in FIG. 1.

In the information system having the configuration shown in FIG. 2, the terminal 100 (and, similarly, the terminal 200) has a video camera 10a capable of capturing still-picture data and moving-picture data that can be utilized by a computer. The status information sensing device 11a includes a GPS (Global Positioning System) for sensing the position of the terminal 100. The transmission data generator 12a generates information, which is capable of being utilized by a computer, based upon video (image data) captured by the video camera 10a and the position sensed by the status information sensing device 11a. The transmitter 14a transmits the generated information to the WWW server 300 on the Internet 400 at the time intervals decided by the transmission interval setting unit 13a. The information display terminal 500, which is connected to the WWW server 300, reads out this information and superimposes the information on a map, which is displayed on a display screen, to display a figure that corresponds to the terminal 100.

Assume that the address storing the status of the terminal 100 and the file name are as follows:

http://dbserver.abc.co.jp/camera1/state.html

That is, assume that the Internet address in the WWW server 300 is "dbserver.abc.co.jp".

Similarly, assume that the address storing the status of the terminal 200 and the file name are as follows:

http://dbserver.abc.co.jp/camera2/state.html

Since the terminal 100 (and, similarly, the terminal 200) is capable of sensing its own position by the status information sensing device 1a, the terminal 100 outputs this data to the transmission data generator 12a and the transmitter 14a transfers this data with the file name "state.html" of the above-mentioned address at intervals decided by the transmission interval setting unit 13a. This is received and the receiving side writes the data by a program whose file name is input-cgi.

The written data is text. If the terminal is located at a position indicated by Long. 135°15'20"E and Lat. 40°15'10"N, then a total of 15 bytes of data are generated, namely a 1-byte ASCII character string and a 7-byte ASCII character string of longitude information indicating east and west longitude and a 1-byte ASCII character string and a 6-byte ASCII character string of latitude information indicating north and south latitude. If the terminal 100 is at the above-mentioned position, then the text information is

E1351520N401510

The transmitter 14a transfers this text information to the WWW server 300 at e.g., one-second intervals (specified by the transmission interval setting unit 13a) in accordance with the Internet Protocol with the address and file name cited earlier. This information is written to the WWW server 300. In a case where the terminals 100, 200 are installed in automobiles, for example, the transmitter 14a would be typified by a cellular telephone and dedicated communication adapter, etc.

It is assumed that the transmission interval setting unit 13a has been set beforehand to the time intervals for transmission of position information, etc. However, the invention is not limited to this embodiment. For example, an arrangement may be adopted in which it is possible to alter a setting subsequently by data transmitted by the GET method of HTTP.

The WWW server 300 writes the data thus received from the terminals 100, 200 to the locations indicated by the designated addresses.

The information display terminal 500 causes the WWW server 300 to transfer the following two files:

dbserver.abc.co.jp/camera1/state.html
dbserver.abc.co.jp/camera2/state.html obtains the coordinates of the terminals 100, 200 and displays symbols and figures representing the terminals 100, 200 on the corresponding locations of a map already being displayed.

Figure 3:
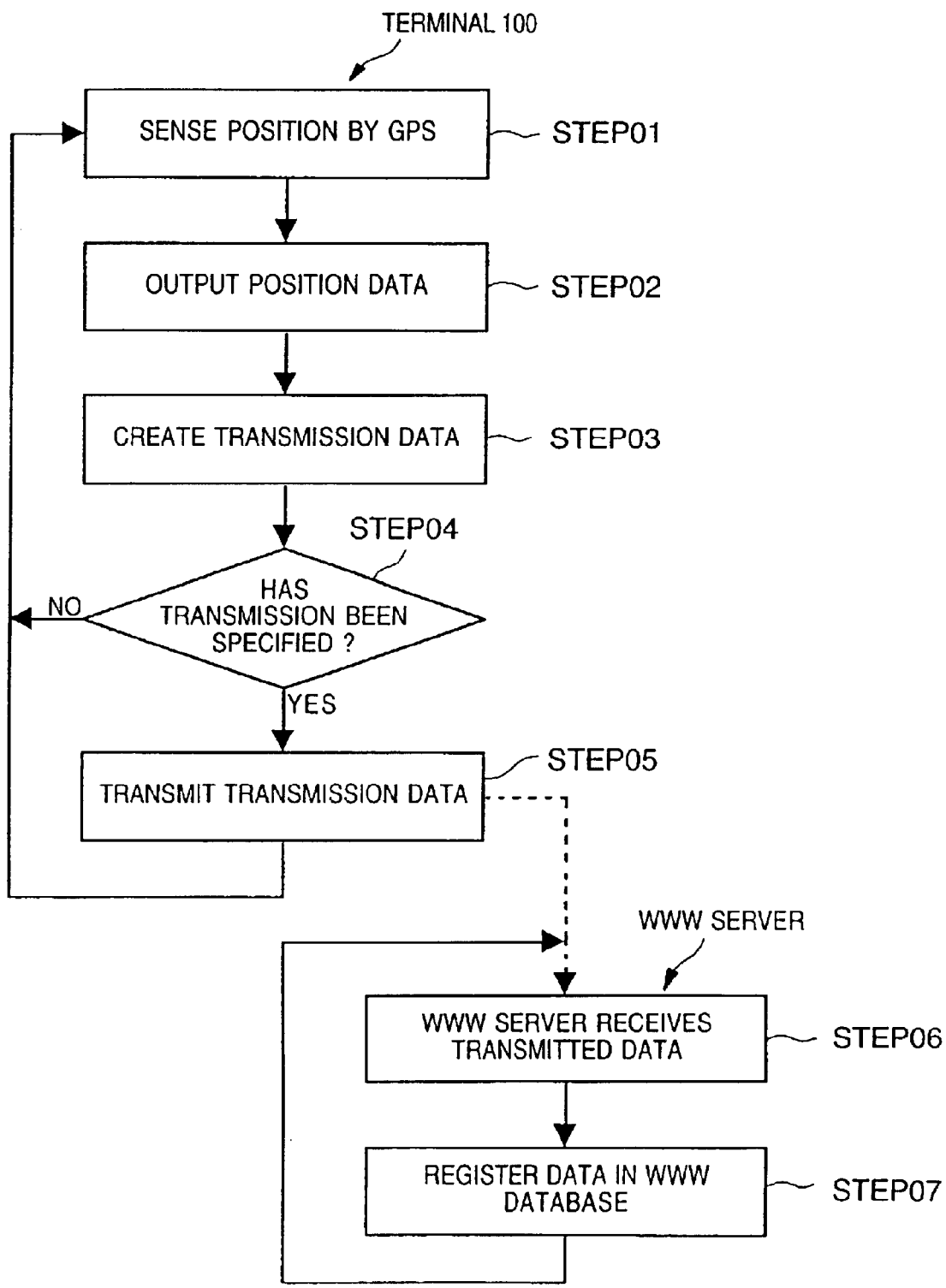
FIG. 3 is a flowchart illustrating the procedure of processing according to the first embodiment.
Figure 4:
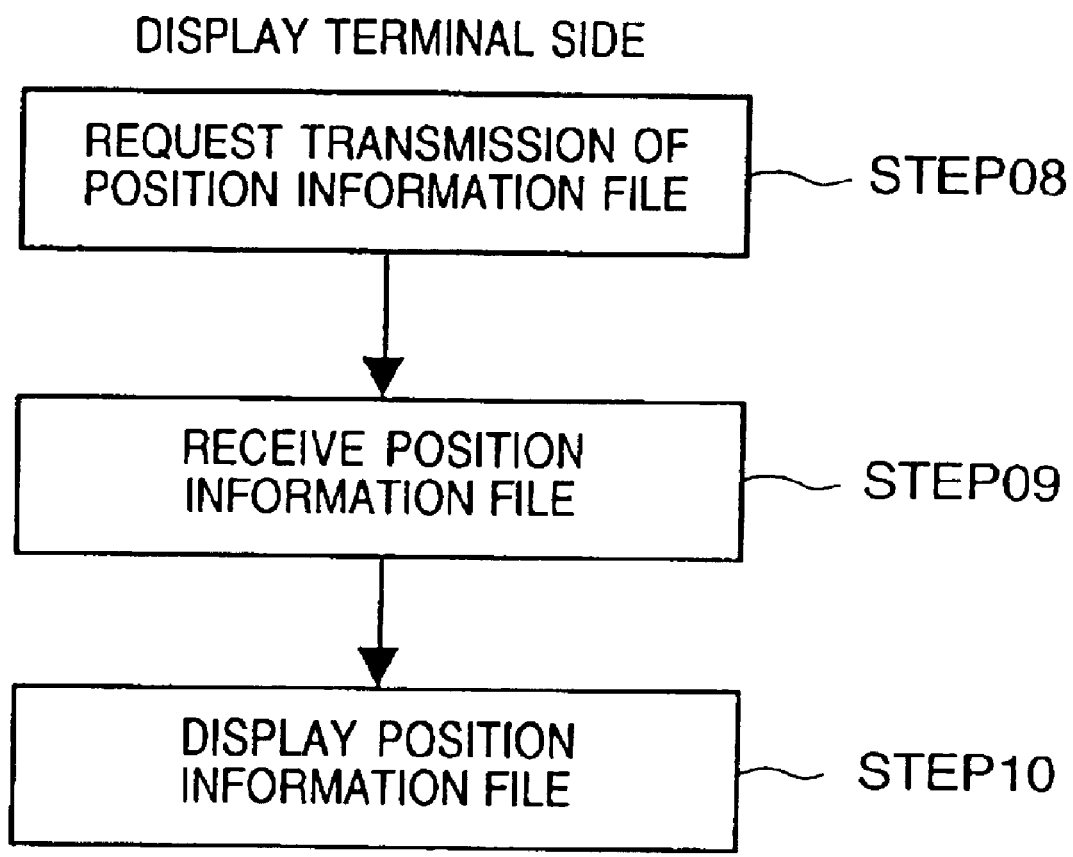
FIG. 4 is a flowchart illustrating the procedure of processing according to the first embodiment.

This operation is as illustrated in the flowcharts of FIGS. 3 and 4. The processing executed by terminal 100 (and, similarly, by terminal 200) will be described first. It will be assumed below that the IP address corresponding to the DNS (Domain Name Service) of the WWW server 300 is 192.168.100.1 and that the file name of the data input CGI program is "input-cgi".

The status information sensing device 11*a* senses the position of terminal 100 at step 01. This is followed by step 02, at which the terminal 100 outputs the data indicative of the position sensed by the status information sensing device 11*a* at step 01 to the transmission data generator 12*a*. Next, at step 03, the transmission data generator 12*a* senses the fact that position data was output at step 02, creates transmission data and outputs this data to the transmitter 14*a*. The transmission data is an ASCII character string for transmission by a QUERY_STRING variable utilizing the GET method of HTTP. The data has the following format:

GET (input CGI program name) ? (QUERY_STRING variable)

For example, transmission data is created from the position data output at step 02. Longitude data is the first eight bytes and latitude data in the next seven bytes.

X=longitude data (assumed to be Long. 135°15'20"E)

Y=latitude data (assumed to be Lat. 40°15'10"N)

The URL character string U specifying the status information of the terminal 100 is URL. The transmission data is accompanied by the definition of parameters in the QUERY_STRING variable and the "&", which is the descriptor between parameters.

In the URL character string, a ":" or "/" within the QUERY_STRING variable is a reserved word. Therefore, an URL is created in which a conversion is made to "%3A" obtained by encoding ":" and to "%2F" obtained by encoding "/". Accordingly, the transmission data is as follows:

GET/input-cgi?X=E1351520&Y=N401510&U=http%3A%2F%2Fdbserver.abc.co.jp%2Fcamera1%2Fstate.html Next, at step 04, the transmission interval setting unit 13*a* determines whether a preset time interval has elapsed from the previous data transmission time. If a preset time interval (e.g., one second) has elapsed from the previous data transmission time, then control proceeds to step 05. If the preset time has not elapsed, control returns to step 01 and the transmission character string data that was output to the transmitter 14*a* is discarded.

This is followed by step 05, at which the transmission character string data output by the transmission data generator 12*a* at step 03 is transmitted to the WWW server 300, which is the destination of the transmission, by the transmitter 14*a*. More specifically, the following processing is executed:

A socket is created at step 05-1.

Next, the IP address (192.168.100.1) of the transmission destination (WWW server) and the port number (a well-known HTTP port number, namely "80", for which the WWW server 300 presumes communication by HTTP) are set at step 05-2.

This is followed by step 05-3, at which a connection to the transmission destination 192.168.100.1 (WWW server 300) set at step 05-2 is created.

A transmission character string is transmitted at step 05-4. The character string transmitted in this case is that created at step 03, namely GET/input-cgi?X=E1351520&Y=N401510&U=http%3A%2F%2Fdbserver.abc.co.jp%2Fcamera1%2Fstate.html After the WWW server 300 on the receiving side receives the data at step 06, the socket is closed at step 05-5.

Processing executed by the WWW server 300 will be described next.

The transmission character string transmitted at step 05 is received by the WWW server 300 at step 06.

The character string data received at step 06 is classified into position information data and URL information data and the position information data is stored in a file indicated by the URL position data at step 07. More specifically, position information data and URL information data is separated from the character string data received at step 06, and the position information data is stored in a file indicated by the URL information data.

The received character string data is classified into position information data URL information data at step 07-1. In the received character string, what is processed as QUERY_STRING is the character string that follows the "?". If this is separated at the descriptors "&", we have

"X=E1350520"

"Y=N401510"

"U=http%3A%2F%2Fdbserver.abc.co.jp%2Fcamera1%2Fstate.html

The position information is converted to an easily understandable form at step 07-2.

E1351520→Long. 135°15'20"E
N401510→Lat. 40°15'10"N

The URL information is decoded at step 07-3. The result is "U=http://dbserver.abc.co.jp/camera1/state.html".

Next, at step 07-4, the position information is stored, with an appended HTML header and the like, in the file indicated by the URL decoded at step 07-3. This information is stored as text data in the HTML format. More specifically, the text file is as follows:

<HTML>

<BODY>

Long. 135°15'20"E<BR>

Lat. 40°15'10"N<BR>

</BODY>

</HTML>

The operation performed by the information display terminal 500 will be described next.

In order to display the positions of the terminals 100 and 200 registered at step 07, the information display terminal 500 sends the WWW server 300 a request for display of the position information relating to the terminals 100, 200 at step 08. More specifically, the URL "http://dbserver.abc.co.jp/camera1/state.html" indicating the status information of the terminals 100, 200 is specified by the WWW browser program executed by the information display terminal 500, whereby the HTML file is displayed.

This is followed by step 09, at which the WWW server 300 responds to the request made at step 08 for display of the position information relating to the terminals 100, 200 by transmitting the position information display data of the input/output unit 10 to the information display terminal 500. The information display terminal 500 receives this data.

Longitude and latitude are displayed as character strings based upon the position information display data of the terminals 100, 200 transmitted at step 09.

When these character strings are displayed, the display presented is as follows:

Long. 135°15'20"E
Lat. 40°15'10"N

It should be noted that prescribed symbol marks may be displayed at locations corresponding to the positions of the terminals 100, 200 on a map already being displayed on a display screen provided on the information display terminal 500.

<Second Embodiment>

A second embodiment of the present invention will now be described. The second embodiment is basically the same as the first embodiment, though the directions of the terminals 100, 200 are sensed in this embodiment.

Figure 5:
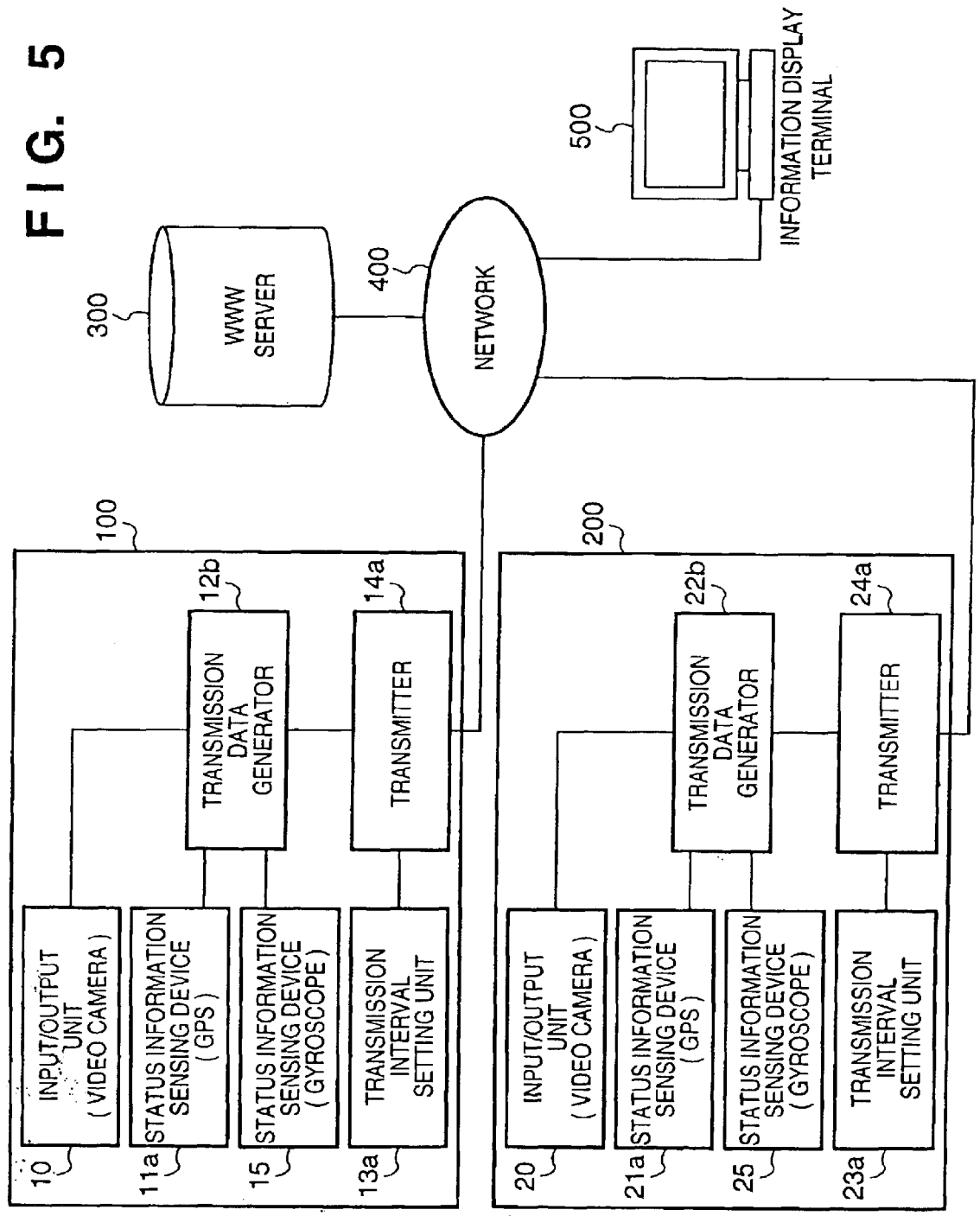
FIG. 5 is a system block diagram according to a second embodiment.

FIG. 5 is a block diagram illustrating the configuration of a system according to a second embodiment of the present invention.

In the second embodiment, the information system constructed as shown in FIG. 5 is obtained by adding a status information sensing device (gyroscope) 15, which is for sensing direction, to the first embodiment, and providing a transmission data generator 12b, for generating transmission data in accordance with data from the status information sensing devices 11a, 15.

By virtue of this arrangement, the terminal 100 (and, similarly, the terminal 200) transmits an URL specifying the position and direction of the terminal 100 to the WWW server 300 via the network 400 at time intervals set in the transmission interval setting unit 13a. As a result, the information representing the positions and directions of the plurality of terminals 100, 200 is registered in the WWW server 300 and is displayed on the information display terminal 500.

According to the second embodiment as well, the input/output unit 10 is an input unit such as a video camera for entering digital image data capable of being utilized by a computer, by way of example. However, the input/output unit is not limited to that of this embodiment. If the input/output device is a peripheral device capable of inputting/outputting data utilizable by a computer, a peripheral other than a video camera (e.g., a printer or scanner, etc.) may be used.

Further, though the connected input/output unit is singular, the invention is not limited to this embodiment.

The status information sensing devices 11a and 15 have been described taking as examples the GPS for sensing position and the gyroscope for sensing direction. However, this does not impose a limitation upon the embodiment, and any sensor for sensing the status of the input/output unit 10 may be used. For example, if the input/output unit is a camera, the sensor may be one which senses associated status information (amount of light received, volume, temperature, electromagnetic wave intensity, etc.).

It is assumed that the network is a 10 Base-T Ethernet capable of communicating in accordance with TCP/IP, by way of example. However, the invention is not limited to this the embodiment, for the protocol can be another capable of handling HTTP and another network such as a 100 Base-TX or FDDI network scheme may be used. Further, though HTTP 1.0 has been described as an example of a communication protocol, an upper compatible protocol of HTTP such as HTTP 1.1 may be used.

The transmitter is assumed to be a computer capable of transmitting status information and the URL of each input/output unit via a QUERY_STRING variable by the GET method of HTTP, and a transmission program executed by the computer, by way of example. However, the invention is not limited to this embodiment. The transmitter may be other than a computer and may utilize a method other than the GET method, such as the POST method of HTTP.

The WWW server 300 is assumed to comprise a computer; a data input CGI (Common Gateway Interface) program, which is a WWW server program executed by the computer for receiving data entered into the QUERY_STRING variable sent from the transmitter by the GET method of HTTP, and converting the data to a data format capable of being utilized by a data base; and a WWW server for providing information in response to an information display request from the information display terminal. However, the invention is not limited to this embodiment.

The information display terminal 500 is assumed to be a computer and a WWW browser program executed by the computer. However, the invention is not limited to this embodiment. Any display terminal may be used so long as it is capable of displaying HTML (HyperText Markup Language) 2.0 and HTML files written in HTML 2.0 or later.

Figure 6:
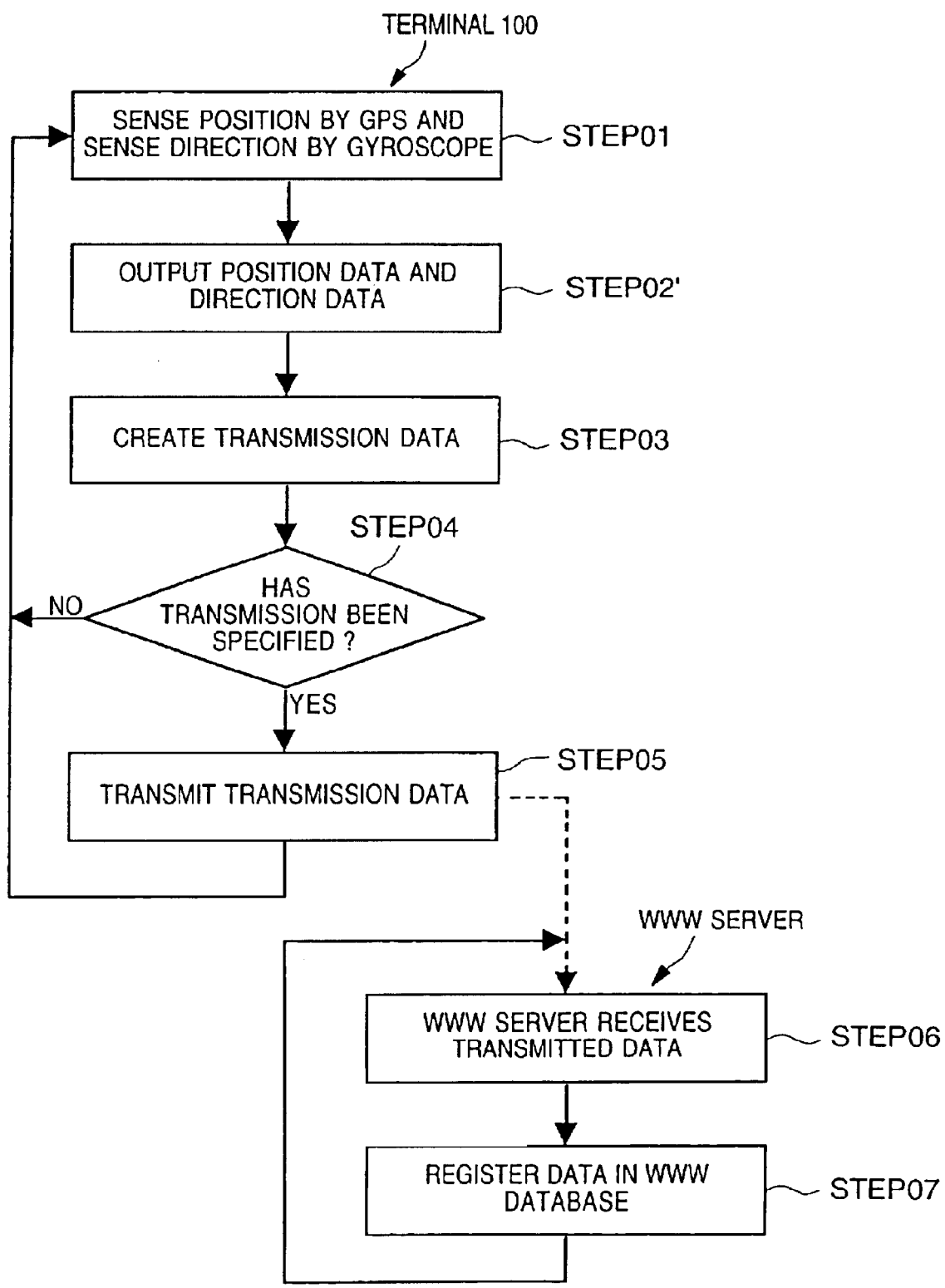
FIG. 6 is a flowchart illustrating the procedure of processing according to the second embodiment.
Figure 7:
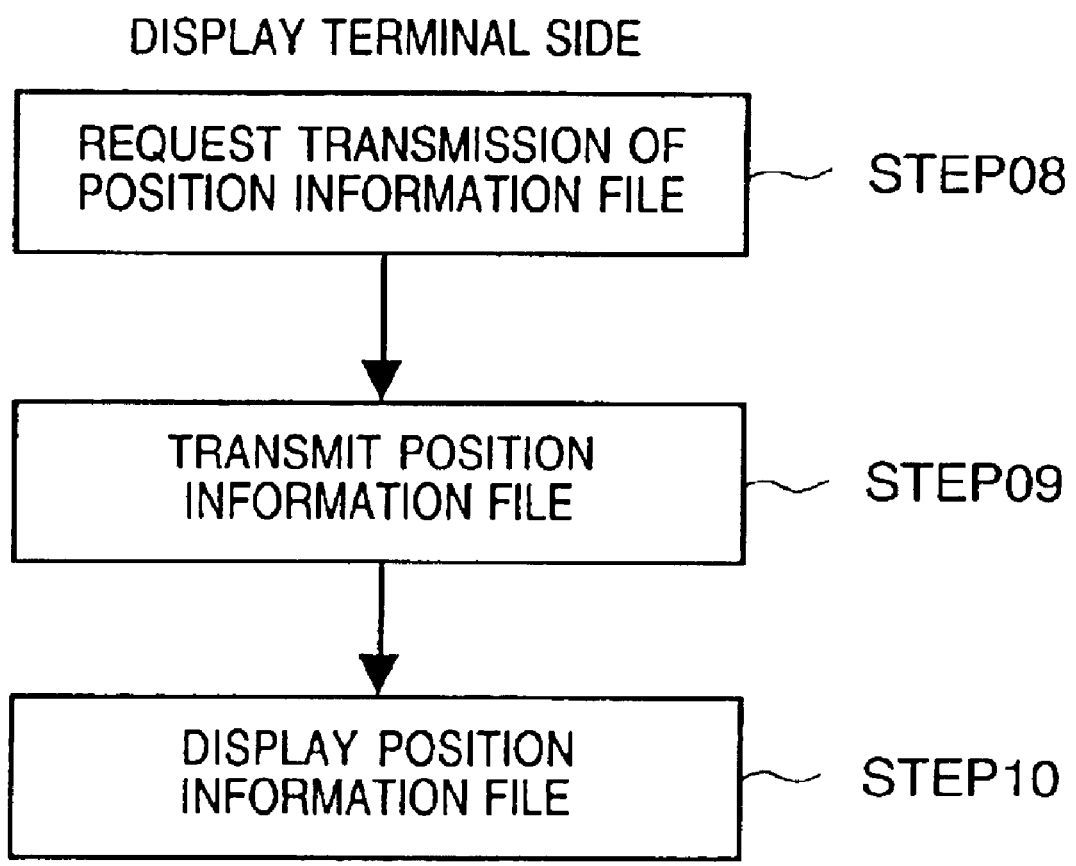
FIG. 7 is a flowchart illustrating the procedure of processing according to the second embodiment.

The operation of the second embodiment is as shown in the flowcharts of FIGS. 6 and 7. This embodiment differs from the first embodiment in the addition of the information indicating the direction of the terminals 100, 200. It is assumed here that the heading of the terminal 100 is 90° (East) in the clockwise direction, with North being 0°. Similarly, it is assumed that the heading of the terminal 200 is 180° (South) in the clockwise direction, with North being 0°.

The status information sensing device 15 is assumed to be a gyroscope for sensing the orientation of the input/output unit 10, sensing 3-byte orientation information ASCII character string data (D) and outputting this data to the transmission data generator 12b at appropriate time intervals. For example, since it is assumed that the terminal has a bearing of 90° (East) in the clockwise direction, with North being 0°, the status information sensing device 15 outputs the data to the transmission data generator 12b as digital data having the format

090

Reference will be had to FIGS. 6 and 7 to describe a procedure for registering status information (position information, direction information), which is associated with the input/output unit 10, in the WWW server, and a procedure for displaying the registered status information on the information display terminal. (Similar procedures hold for the input/output unit 20.)

The status information sensing device 11a senses the position of terminal 100 and the information sensing device 15 senses the direction of terminal 100 at step 01. This is followed by step 02, at which the terminal 100 outputs the data indicative of the position and the data indicative of the direction sensed at step 01. For example, if the position of the terminal 100 is Long. 135°15'20"E, Lat. 40°15'10"N and the direction of the terminal 100 is 90° (East) in the clockwise direction, with North being 0°, then the status information sensing device 11a and information sensing device 15 output data to the transmission data generator 12b as digital data having the format E1351520N401510
and
090
respectively, at time intervals of one second, by way of example.

Next, at step 03', transmission data is created in accordance with the position data output at step 02. The transmission data is a character string for transmission by a QUERY_STRING variable utilizing the GET method of HTTP. The data has the following format:

GET (input CGI program name)? (QUERY_STRING variable)

Transmission data is created from the position data output by the status information sensing device (GPS) 11a. Longitude data is the first eight bytes and latitude data in the next seven bytes.

X=longitude data
Y=latitude data

Direction data output by the information sensing device (gyroscope) 15 at step 02 is D=direction data The URL character string specifying the status information of the input/output unit 10 is

U=URL

The transmission data is accompanied by the definition of parameters in the QUERY_STRING variable and the "&", which is the descriptor between parameters.

In the URL character string, a ":" or "/" within the QUERY_STRING variable is a reserved word. Therefore, an URL is created in which a conversion is made to "%3A" obtained by encoding ":" and "%2F" obtained by encoding "/". Accordingly, the transmission data is as follows:

GET/input-cgi?X=E1351520&Y=N401510&D=090&U=http%3A%2F%2Fdbserver.abc.co.jp%2Fcamera1%2Fstate.html Next, at step 04, the transmission interval setting unit 13a determines whether a preset time interval has elapsed from the previous data transmission time. If a preset time interval has elapsed from the previous data transmission time, then control proceeds to step 05. If the preset time has not elapsed, the transmission character string data that was created at step 03' is discarded and control returns to step 01.

This is followed by step 05, at which the transmission character string data created at step 03' is transmitted to the WWW server 300, which is the destination of the transmission, by the transmitter 14a. More specifically, the following processing is executed:

A socket is created at step 05-1.

Next, the IP address (192.168.100.1) of the transmission destination (WWW server 300) and the port number (a well-known HTTP port number, namely "80", for which the WWW server 300 presumes communication by HTTP) are set at step 05-2.

This is followed by step 05-3, at which a connection to the transmission destination 192.168.100.1 (WWW server 300) set at step 05-2 is created.

A transmission character string is transmitted at step 05-4. The character string transmitted in this case is that created at step 03, namely GET/input-cgi?X=E1351520&Y=N401510&D=090&U=http%3A%2F%2Fdbserver.abc.co.jp%2Fcamera1%2Fstate.html After the WWW server 300 on the receiving side receives the data at step 06, the socket is closed at step 05-5.

The transmission character string transmitted at step 05 is received by the WWW server 300 at step 06.

Next, at step 03, the received character string data received at step 06 is classified into position information data, direction information data and URL information data, and the position information data and direction information data is stored in a file indicated by the URL position data.

More specifically, at step 07-1, the received character data is classified into the position information data, direction information data and URL information data. In the received character string, what is processed as QUERY_STRING is the character string that follows the "?". If this is separated at the descriptors "&", we have "X=E1350520"
"Y=N401510"
"D=90"
"U=http%3A%2F%2Fdbserver.abc.co.jp%2Fcamera1%2Fstate.html The position information is converted to an easily understandable form at step 07-2.

E1351520→Long. 135° 15'20"E
N401510→Lat. 40°15'10"N

The direction information is converted to an easily understandable form at step 07-3.

The URL information is decoded at step 07-3. In this case the result is

"U=http://dbserver.abc.co.jp/camera1/state.html".

Next, at step 07-4, the position information is stored, with an appended HTML header and the like, in the file indicated by the URL decoded at step 07-3. This information is stored as text data in the HTML format. More specifically, the text file is as follows:

<HTML>
<BODY>
Long. 135°15'20"E<BR>
Lat. 40°15'10"N<BR>
<IMG SRC="090.gif">
</BODY>
</HTML>

Here it is assumed that 360 files (000.gif through 359.gif) of arrow images indicating directions of the terminal 100 have been prepared in the WWW server beforehand.

In order to display the position of the terminal 100 registered at step 07, the information display terminal 500 sends the WWW server 300 a request for display of the position information relating to the terminal 100 at step 08. More specifically, the URL "http://dbserver.abc.co.jp/camera1/state.html" indicating the status information of the input/output unit 10 is specified by the WWW browser program executed by the information display terminal 500, whereby the HTML file is displayed.

This is followed by step 09, at which the WWW server 300 responds to the request made at step 08 for display of the position information relating to the terminal 100 by transmitting the position information display data of the terminal 100 to the information display terminal 500.

On the basis of the status information display data of the terminal 100 transmitted at step 09, the information display terminal 500 constructs and displays the following position information and direction information from the status information display data of the terminal 11:

Long. 135°15'20"E
Lat. 40°15'10"N
→

In a case where the display is presented on a map, the arrow is displayed at this position and the arrow is pointed in the direction that agrees with the direction information that has been received.

Thus, information indicating the position and direction of the terminal 100 is registered in the WWW server 300 and can be displayed on the information display terminal 500.

In the first and second embodiments, the information display terminal 500 is described as being separate from the terminals 100, 200. However, the terminal 100 or 200 and the terminal 500 may be incorporated in the same unit. For example, the components for implementing the function of the information display terminal 500 can be provided within the terminal 100, thereby making it possible for the user of terminal 100 to verify information relating to the user's own terminal as well as the status of the terminal 200.

The change in the status of a terminal in the present invention is not limited to a change in position but includes other types of change. For example, states include a communication state, a busy state, etc.

Thus, in accordance with the embodiments, as described above, a change in the status of a terminal is communicated to a server using HTTP, by way of example. As a result, it is possible for status information of a plurality of input/output units to be utilized by a WWW database without providing a dedicated input/output communication port, dedicated communication format and dedicated server.

Further, the general-purpose protocol of the present invention is not limited to HTTP and it is permissible to use other protocols such as the protocol employed by the Ethernet. Further, whether there has been a change in the status of a terminal is transmitted to a server at predetermined time intervals in the illustrated embodiments. However, it is possible to adopt an arrangement in which the transmission is made only when a change in status occurs.

Thus, in accordance with the first and second embodiments described above, it is possible to supply information indicative of the status of an object terminal through a simple arrangement while utilizing a general-purpose network.

<Third Embodiment>

Figure 8:
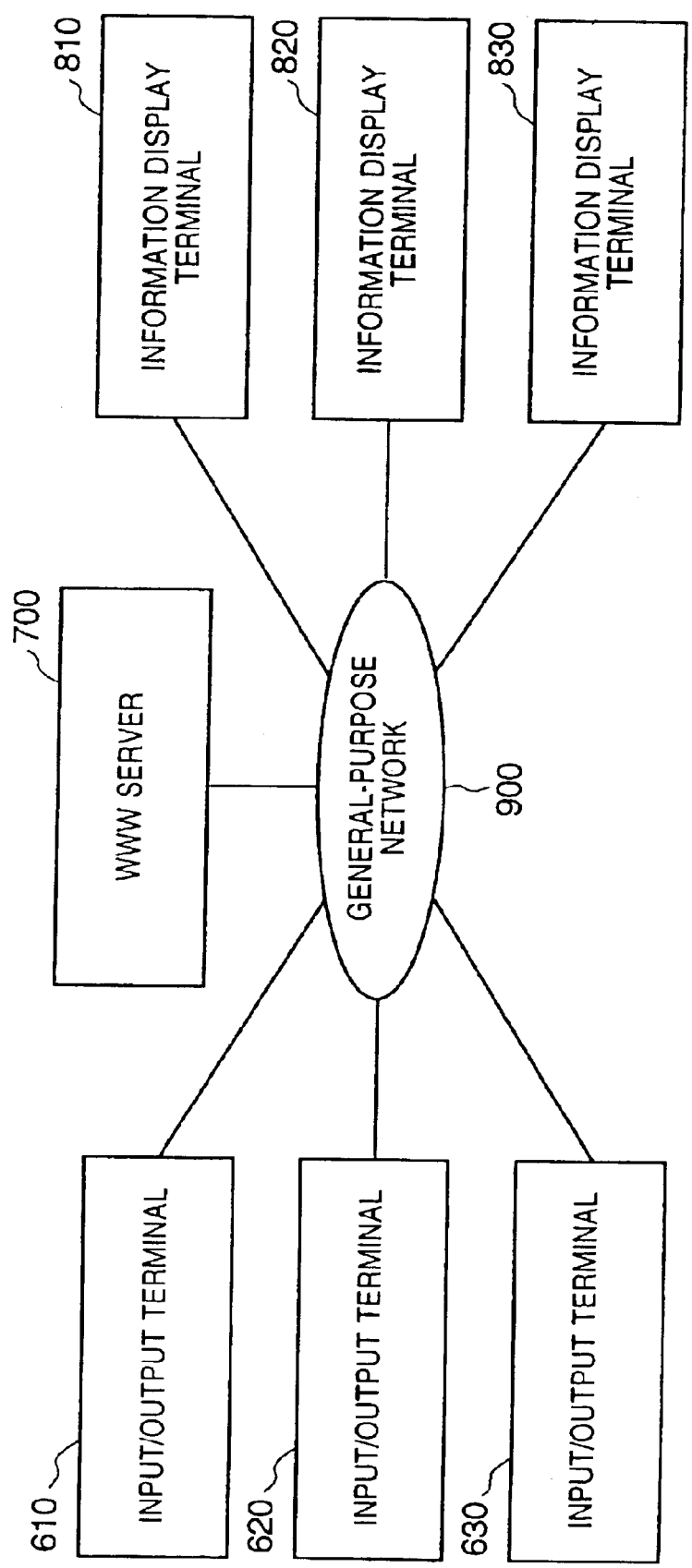
FIG. 8 is a block diagram showing the configuration of an information providing system according to a third embodiment of the present invention.

FIG. 8 illustrates the configuration of an information providing system according a third embodiment of the present invention.

The information providing system generally comprises three sections, namely input/output terminals 610–630, a WWW server 700 and information display terminals 810–830. These sections are interconnected via a general-purpose network (e.g., The Internet) 900.

Figure 9:
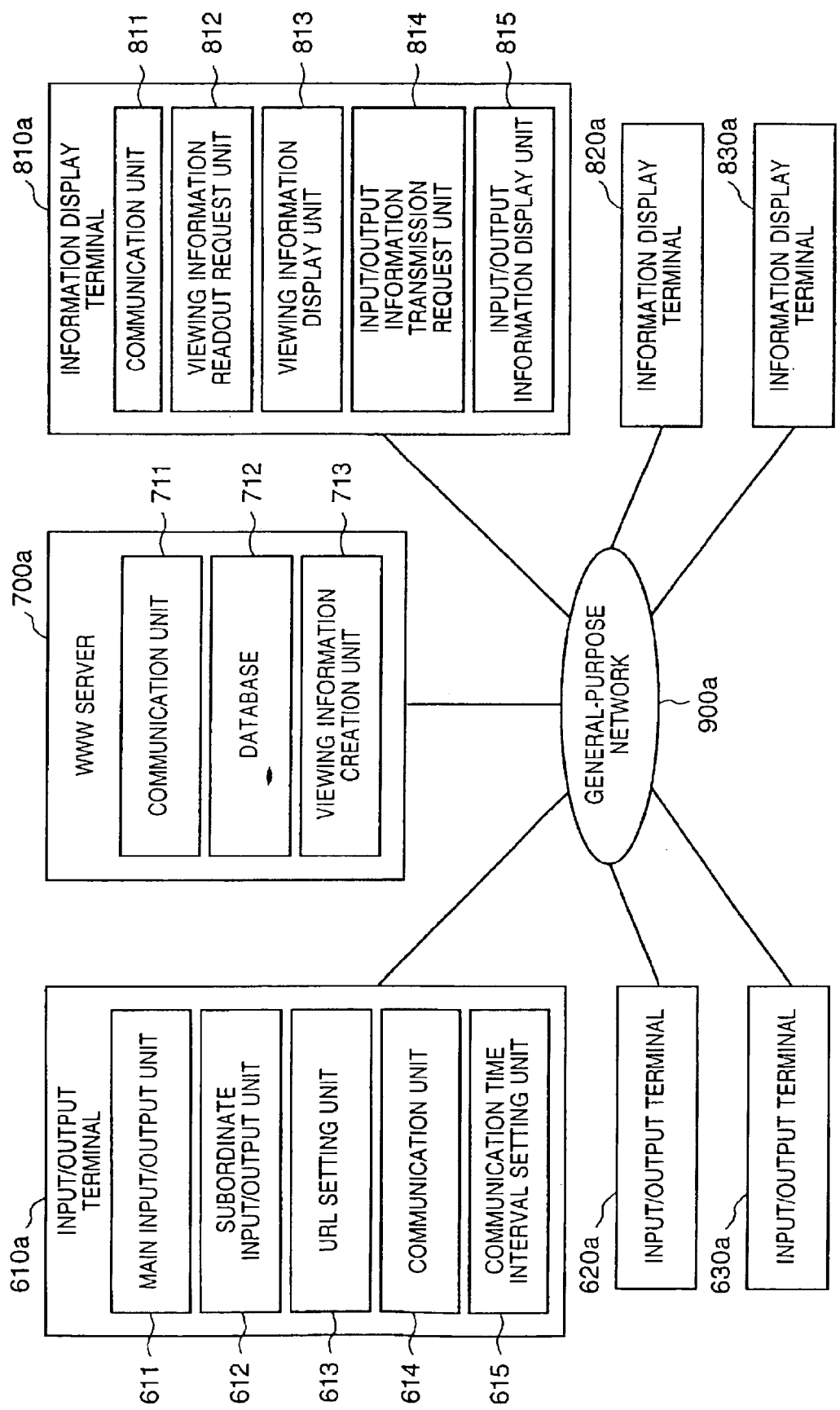
FIG. 9 is a block diagram showing the details of the information providing system according to the third embodiment.

FIG. 9 is a diagram showing a specific example of application of the system of FIG. 8. In FIG. 9, components 610a–900a corresponding to the components 610–900 shown in FIG. 8.

In the information providing system having the construction shown in FIG. 9, the input/output terminal 610a includes a main input/output unit 611, a subordinate input/output unit 612, an URL information setting unit 613, a communication unit 614 and a communication time interval setting unit 615. The input/output terminals 620a, 630a have a construction similar to that of the input/output terminal 610a.

The WWW server 700a includes a communication unit 711, a database 712 and a viewing information creation unit 713.

The information display terminal 810a includes a communication unit 811, a viewing information readout request unit 812, a viewing information display unit 813, a transmission request unit 814 for dealing with input/output information, and a display unit 815 for displaying the status of the input/output display terminal. The information display terminals 820a, 830a have a construction similar to that of the information display terminal 810a.

The main input/output unit 611 of the input/output terminal 610a has a video camera capable of capturing still-picture digital data and moving-picture digital data that can be utilized by a computer and of outputting the video digital data obtained.

The subordinate input/output unit 612 has a GPS (Global Positioning System) for sensing the position of the input/output terminal 610a and outputting the sensed position to an external unit as position information digital data utilizable by a computer.

The URL information setting unit 613 sets URL information relating to the video digital data that is main input/output information. It is assumed that URL information relating to the main input/output information of individual input/output terminals has been set.

The communication unit 614 sends the WWW server 700a the URL information relating to the main input/output information as well as subordinate input/output information at time intervals that have been set by the communication time interval setting unit 615, receives an input/output information transmission request from each information display terminal and responds to the input/output information transmission request by transmitting the main input/output information to the information display terminal that issued the input/output information transmission request.

The communication time interval setting unit 615 sets the time intervals at which various information is transmitted to the WWW server 700a.

The communication unit 711 in the WWW server 700a receives URL information and position information, which is subordinate input/output information, transmitted from the input/output terminals 610a–630a, and viewing information display requests transmitted from the information display terminals 810a–830a, and transmits viewing information, which has been created by the viewing information creation unit, to the information display terminal that issued the viewing information display request.

On the basis of URL information from each input/output terminal received by the communication unit 711, the database 712 stores position information as well as subordinate input/output information (position information in this embodiment), which has been received from each input/output terminal, and is capable of retrieving this information.

In response to a viewing information display request from an information display terminal received by the communication unit 711, the viewing information creation unit 713 retrieves data that has been stored by the database 712 and creates viewing information based upon the retrieved data. More specifically, the viewing information creation unit 713 is a software program executed by computer.

The communication unit 811 in the information display terminal 810a is capable of sending and receiving various information to and from the WWW server 700a and input/output terminals 610a–630a.

The viewing information readout request unit 812 in the information display terminal 810a creates an instruction requesting the WWW server 700a to read out viewing information and transmits the request to the WWW server 700a via the communication unit 811. More specifically, the viewing information readout request unit 812 is one function of an HTML browser program executed by computer.

The viewing information display unit 813 displays viewing information sent back from the WWW server 700a as a response to the viewing information readout request. The viewing information display unit 813 is one function of an HTML browser program executed by computer.

The input/output information transmission request unit 814 creates an instruction requesting transmission of input/ output information. The request is transmitted to a specific input/output terminal selected by the user from the input/output terminals displayed by the viewing information.

The input/output information display unit 815 displays input/output information sent back from the specific input/output terminal, which has been selected by the user, as a response to the input/output information transmission request. The display unit 815 is one function of an HTML browser program executed by computer.

The general-purpose network 900a is assumed to be the Internet and to utilize the TCP/IP.

The system set forth above will now be described in greater detail.

The input/output terminal 610a is stationary or provided on a moving body such as an automobile. Video data (subordinate data) captured by the input/output terminal 610a and position information (main data) obtained by the GPS is transferred to the WWW server 700a periodically. In particular, in a case where the terminal is provided on a moving body, data and information is transmitted to the WWW server 700a periodically via a device such as a cellular telephone. The information display terminals 810a–830a are each constituted by a personal computer and access the WWW server 700a via the Internet. By transferring the data of the input/output terminal 610a using HTTP, the user of the information display terminal 810a causes the position and captured video of the input/output terminal 610a to be transferred and displayed. It should be noted that while the input/output terminals and information display terminal are illustrated as being separate, an arrangement may be adopted in which the input/output terminals function as the information display terminal.

As a result of the foregoing, the user of the information display terminal is capable of observing the current position of an input/output terminal as well as the video captured by the input/output terminal at that position.

The overall processing of the information providing system according to this embodiment is divided into three portions.

The first portion is processing for registering input/output information of each input/output terminal in the database of the WWW server. The second is processing for reading URL information from the database of the WWW server, creating viewing information and displaying the viewing information on the information display terminal. The third is processing for selecting a specific input/output terminal from the viewing information displayed on the information display terminal and displaying the input/output information of this input/output terminal.

Figure 10:
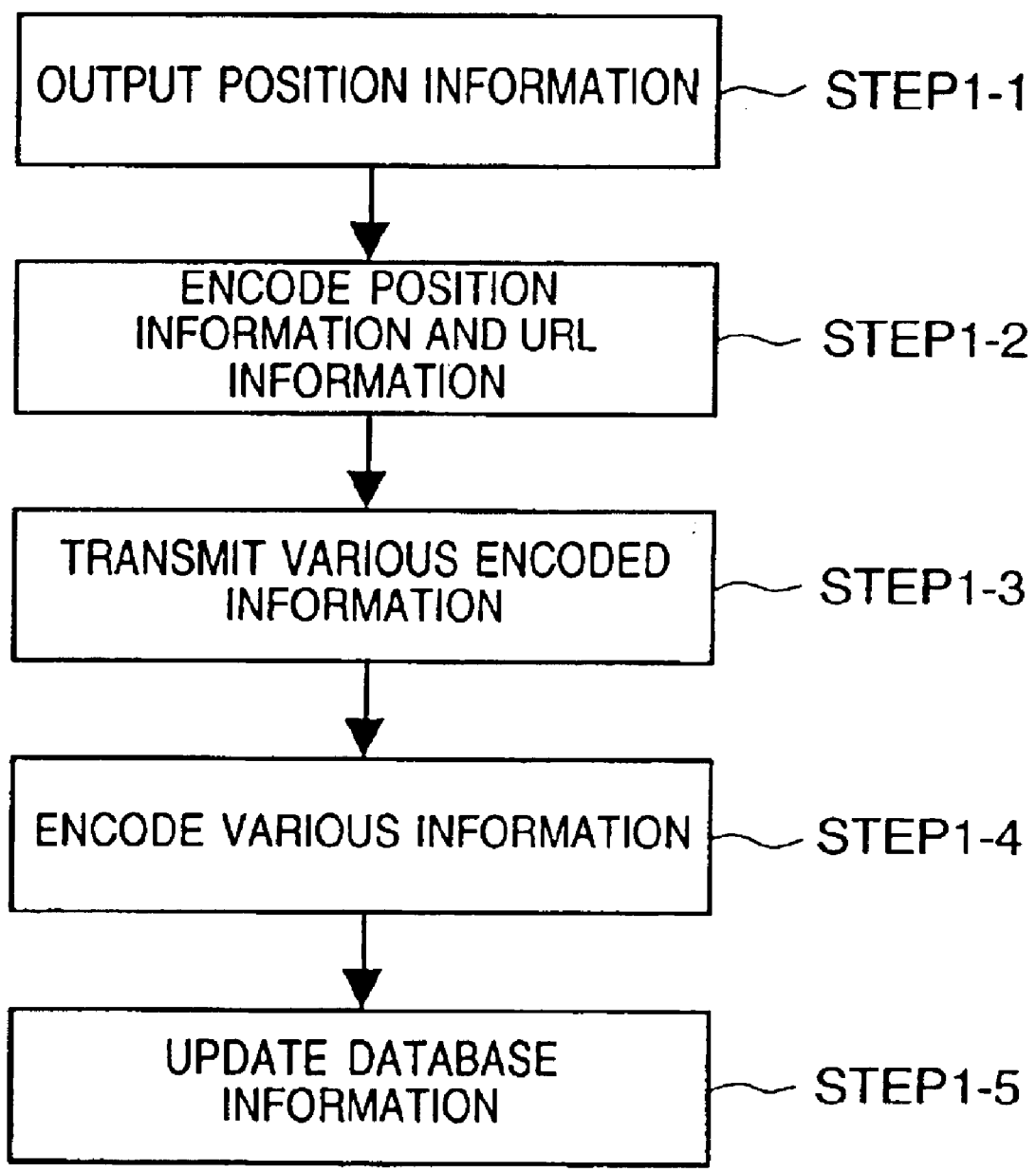
FIG. 10 is a flowchart of database registration processing according to the third embodiment.
Figure 11:
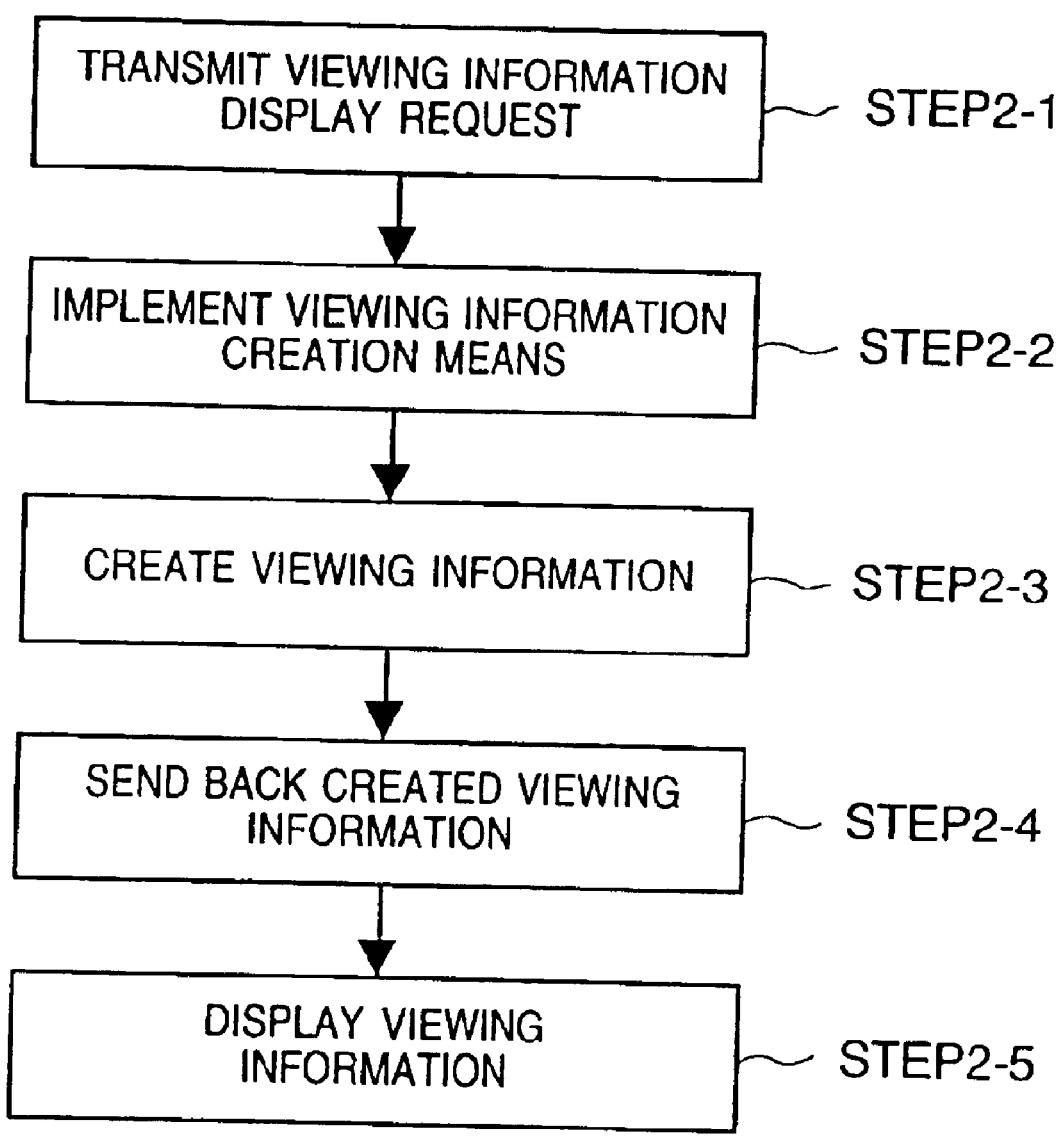
FIG. 11 is a flowchart of processing for creating viewing information according to the third embodiment.

The flow of processing for registering data in the database will be described in detail with reference to FIG. 10.

The URL of the main input/output information that has been set in the URL information setting unit 613 of the input/output terminal 610a is assumed to be as follows:

$$\text{http://wwwserver20}a\text{.abc.co.jp/input10}a\text{/input.abc} \quad (1)$$

where "wwwserver20a.abc.co.jp" is the DNS of the WWW server 700a; "input10a" indicates the input/output terminal 610a; and "input.abc" represents the input/output information resource supplied by the input/output terminal 610a.

It is assumed that the input/output terminal 610a is located at the position indicated by Long. 135°15'20"E and Lat. 40'15'10"N at time 0. It is assumed that the information representing the position sensed by the subordinate input/output unit 612 in the input/output terminal 610a at this time is output by the subordinate input/output unit 612 as an ASCII character string having the following format:

X=E1351520 Y=N401510

The subordinate input/output unit 612 senses position at time 0 and outputs the position information to the communication unit 614 at step 1-1.

Next, at step 1-2, the communication unit 614 generates an ASCII character string having the following format from the position information output by the subordinate input/output unit 612 at step 1-1 and URL information that has been set in the URL information setting unit 613:

GET/input-cgi?X=E1351520&Y=N401510&U=http %3A%2F%2Fwwwserver20a.abc.co.jp%2Finput10a%2F input.abc HTTP1.0 where "GET" represents utilization of the GET method of HTTP; "/input.cgi" indicates the file location, in the WWW server 700a, of the CGI (Common Gateway Interface) program executed by the WWW server 700a; and the character string following "? " signifies stored in the QUERY_STRING variable. The "&" in the QUERY_STRING variable signifies a descriptor for partitioning items of data. Further, "%3A" is the result of encoding ":", which is a reserved word in the QUERY_STRING, and "%2F" is the result of encoding "/". In addition, "HTTP1.0" signifies transmission by HTTP Version 1.0.

This is followed by step 1-3, at which the communication unit 614 utilizes HTTP to transmit the ASCII character string generated at step 1-2 to the HTTP port (TCP port No. 80) of the WWW server 700a at the time intervals set by the communication time interval setting unit 615.

Next, at step 1-4, the WWW server 700a that has received the ASCII character string transmitted at step 1-3 determines, based upon the identifier ".cgi" following the "." of the character string "/input.cgi" immediately preceding the "?" character, whether the CGI program is executed, and delivers the character string following "?" to the CGI program, which is executed by the WWW server 700a, indicated by "/input.cgi".

The "input.cgi" program distinguishes the data partitioned by "&" and decodes the encoded "%3A" and "%2F" to obtain:

latitude information: "E1351520"

longitude information: "N401520"

URL information: "http://wwwserver20a.abc.co.jp/ input10a/input.abc"

Using the URL information distinguished at step 1-4 as a search key, the WWW server 700a searches for data that has been stored in the database 712. If the same URL data is in the database, the WWW server 700a determines that the position information from the same input/output terminal has been updated and updates (overwrites) the latitude and longitude information at step 1-5. If the result of the search is that the same URL information does not exist, the WWW server 700a determines that the information from the above-mentioned input/output terminal has not been registered up to the present time and creates the latitude, longitude and URL information anew to update the same.

The second portion of processing, namely the processing for creating viewing information in the WWW server, will be described with reference to the flowchart of FIG. 10.

It is assumed that the following data has been stored in the database 712 of the WWW server 700a:

data 0 (the information of input/output terminal 610a updated at step 1-5)

latitude information: "E1351520"

longitude information: "N401520"

URL information: "http://wwwserver20a.abc.co.jp/ input10a/input.abc"

data 1 (information of input/output 620*a*)
   latitude information: "E1351500"
   longitude information: "N401440"
   URL information: "http://wwwserver20*a*.abc.co.jp/input11*a*/input.abc"
data 2 (information of input/output 630*a*)
   latitude information: "E1352030"
   longitude information: "N402240"
   URL information: "http://wwwserver20*a*.abc.co.jp/input12*a*/input.abc"

It is assumed that the viewing information of the WWW server is partitioned according to each latitude and longitude and can be utilized by requesting viewing information display of the following by the GET method:

http://wwwserver20*a*.abc.co.jp/latitude/longitude/table.cgi

For example, it is assumed that viewing information in the vicinity of Long. 135°15'E, Lat. 40°15'N can be utilized by transmitting the following character string to the WWW server 700*a* by HTTP:

GET/E13515/N4015/table.cgi HTTP/1.0

In order to display viewing information of the input/output terminal in the vicinity of Long. 135°15'E, Lat. 40°15'N, for example, the user of the information display terminal 810*a* transmits the viewing information display request to the WWW server 700*a* at step 2-1.

More specifically, the ASCII character string
   GET/E13515/N4015/table.cgi HTTP/1.0
is transmitted to the HTTP port (80) of the WWW server 700*a*.

This is followed by step 2-2, at which the WWW server 700*a*, which has received the viewing information display request sent from the information display terminal 810*a*, compares the character string following "GET", from which "HTTP/1.0" at the end has been excluded. Since there is no "?" up to the end of the character string following "GET", the WWW server 700*a* judges that "cgi" at the end of the character string is the identifier and executes the CGI program using the viewing information creation unit 713 in the WWW server 700*a*.

Next, at step 2-3, the CGI program indicated by "table.cgi" retrieves map data that has been stored in the database 712 and creates input/output terminal text information (map information) within limits of ±30' of specified coordinates, namely within limits of Long. 135°14'30"E–Long. 135°15'30"E and Lat. 40°14'30"N–Lat. 40°15'30"N. The details will now be described.

(1) The database is searched for the existence of data within the limits Long. 135°14'30"E–Long. 135°15'30"E and Lat. 40°14'30"N–Lat. 40°15'30"N.

(2) It is found as the result of the search that the data 0 resides at Long. 135°15'20"E, Lat. 40°15'20"N and that the data 1 resides at Long. 135°15'00"E, Lat. 40°14'40"N.

Figure 12:
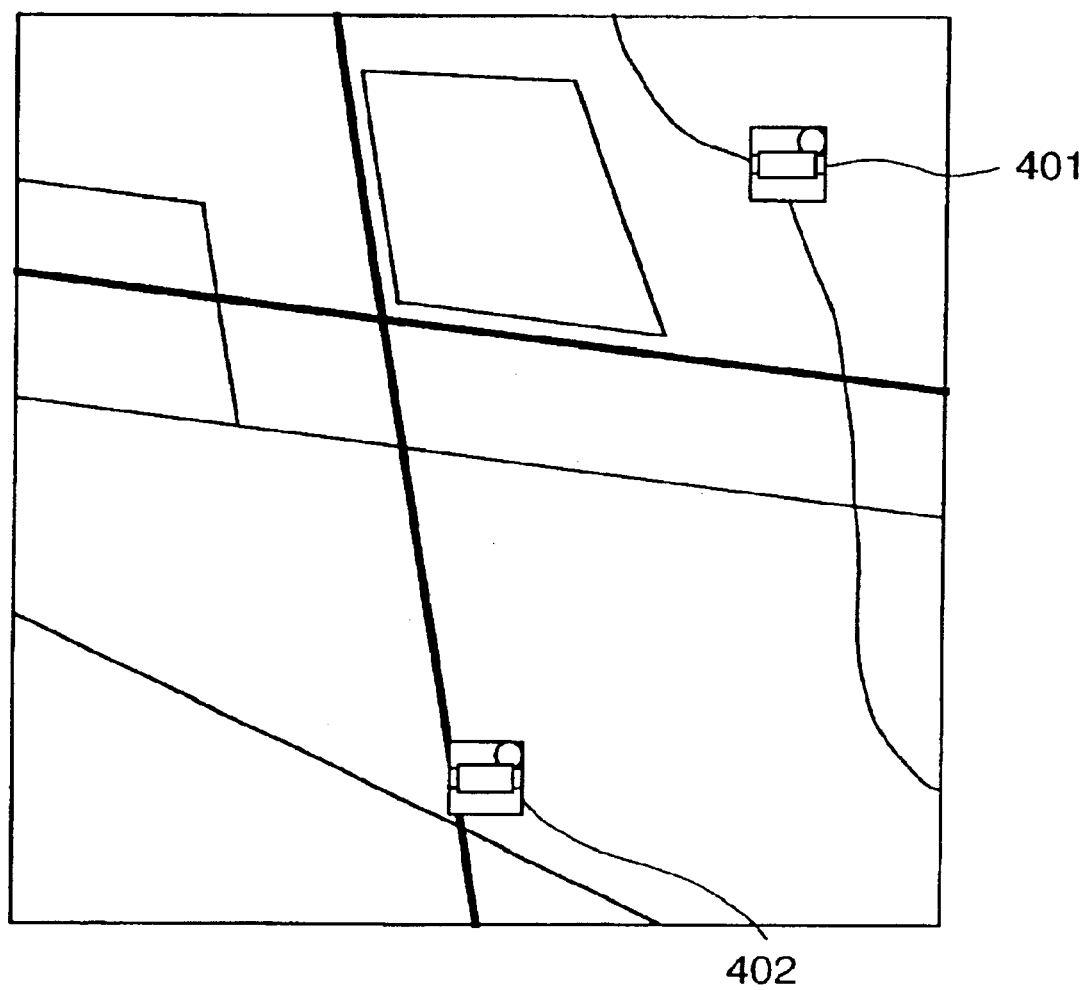
FIG. 12 is a diagram useful in describing an image of viewing information according to the third embodiment.

(3) A partial map image (600×600 pixels) of Long. 135°14'30"E–Long. 135°15'30"E and Lat. 40°14'30"N–Lat. 40°15'30"N created with one second serving as 100 pixels is cut from map information (stored beforehand in the database 712) and an image is generated in which icon images (15×15 pixels each) of the input/output terminals 610*a*, 620*a* are superposed on the map at positions that correspond to actual positions of the respective input/output terminals. The generated image resulting from such superposition is illustrated in FIG. 12.

Figure 13:
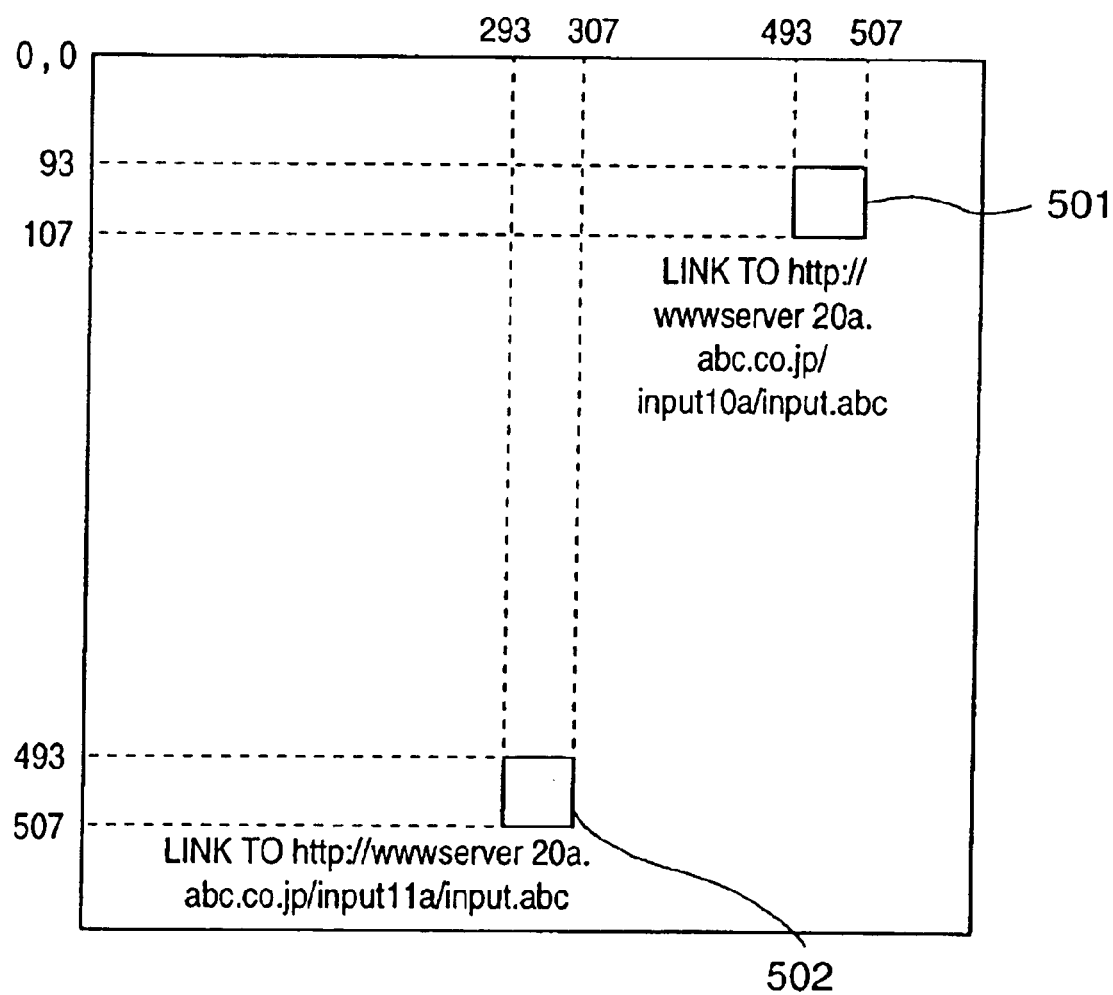
FIG. 13 is a diagram useful in describing an image map that corresponds to the image of viewing information according to the third embodiment.

(4) Image maps corresponding to the icon images that correspond to the input/output terminals 610*a*, 620*a* on the map image are created. FIG. 13 illustrates the areas the areas of the image maps thus created.

URL information relating to each input/output terminal extracted by the search conducted at (1) above is established for URL links corresponding to the respective input/output terminals within the image map. In FIG. 13, URL information relating to the input/output terminal 610*a* is set at the shaded portion 501 at the upper right and URL information relating to the input/output terminal 620*a* is set at the shaded portion 502 at the bottom of FIG. 13.

(5) An HTML file of the viewing information of the input/output terminals is created, as shown in FIG. 15.

This is followed by step 2-4, at which the input/output terminal viewing information that has been created is sent back, via the communication unit 711 of the WWW server 700*a*, to the information display terminal 810*a* that issued the viewing information display request.

Next, at step 2-5, the communication unit 811 of the information display terminal 810*a*, which has received the input/output terminal viewing information sent back at step 2-4, forms and displays the HTML file, which is the received input/output terminal viewing information, using the input/output information display unit 815.

Figure 14:
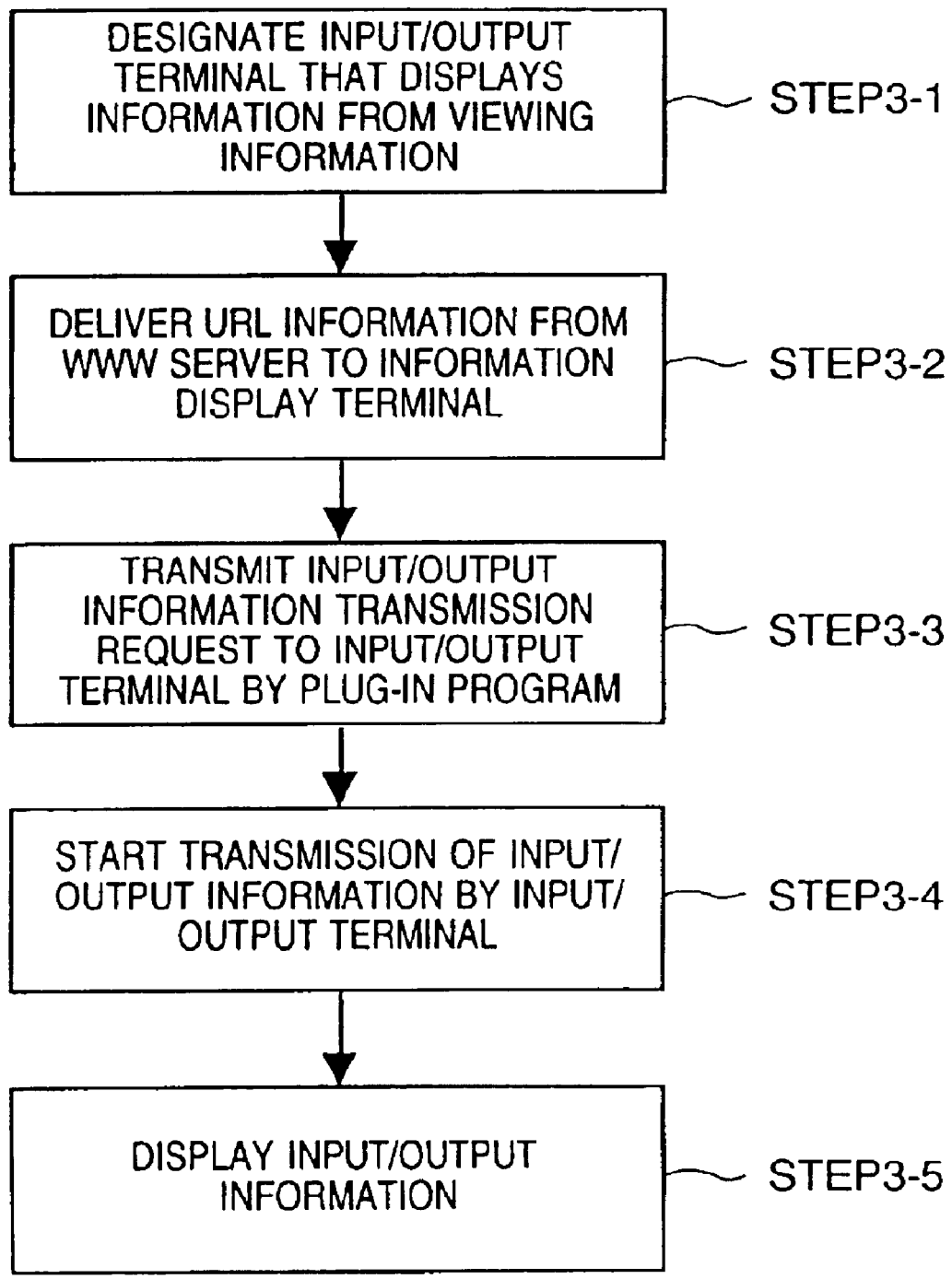
FIG. 14 is a flowchart of processing for displaying input/output information according to the third embodiment.

Finally, the third portion of processing, namely the processing for displaying input/output information of a specific input/output terminal using the viewing information, will be described in detail with reference to FIG. 14.

It is assumed here that the identifier (.abc) of the URL (http://wwwserver20*a*.abc.co.jp/input10*a*/input.abc) has been defined beforehand as a special MIME-TYPE (video/x-abc) at the WWW server 700*a*. Further, it is assumed that the input/output terminal 610*a* is waiting for reception of the input/output information display request at communication port number 65535.

The icon image (401 in FIG. 12) corresponding to the input/output terminal 610*a* on the map image in the input/output terminal viewing information is linked by the image map (FIG. 13) to the URL http://wwwserver20*a*.abc.co.jp/input10*a*/input.abc that indicates the input/output information of the input/output terminal 610*a*.

It should be noted that the IP address of the input/output terminal 610*a* and the port number for communicating the input/output information are described in the form of the following ASCII character strings in the file specified by this URL:

IP 192.168.0.1
   port 65535

The user operating the viewing information display unit 813 of the information display terminal 810*a* employs a mouse at step 3-1 to designate the icon image indicative of the input/output information of a certain desired input/output terminal in the input/output terminal viewing information displayed at steps 2-1 through 2-5. As a result, an input/output information display request is transmitted to this input/output terminal via the communication unit 811. For example, by employing a browser to designate the icon image (401 in FIG. 12) that specifies the input/output terminal 610*a* (the designation is made by clicking on the icon using the mouse), the browser issues a readout request (GET) by HTTP to the URL in the image map. In other words, the communication unit 811 of the information display terminal 810*a* transmits the following ASCII character string GET http://wwwserver20*a*.abc.co.jp./input10*a*/input.abc HTTP/1.0 to the HTTP port (80) of the WWW server 700*a*.

This is followed by step 3-2, at which the WWW server 700*a*, which has received the ASCII character string transmitted at step 3-1, sends back the content of the file indicated by http://wwwserver20a.abc.co.jp./input10a/input.abc
and a response header which includes MIME-TYPE, etc., indicated by ".abc". More specifically, the following ASCII character strings are transmitted to the communication unit of the information display terminal 810a:

HTTP/1.0 200 OK

Data:25 Dec. 1997 11:45 JST

Server: Abcserver

Content-type: video/x-abc

IP 192.168.0.10 port 65535

Next, at step 3-3, the information display terminal 810a that has received the input/output information transmitted at step 3-2 activates the display unit 815, namely a plug-in program of an HTML browser, from the following information Content-type: video/x-abc of the HTTP header. The activated plug-in program transmits an input/output information transmission request to the port number 65535 of the device (information input terminal 10a) having the IP address (192.168.0.10) of the received input/output information.

Next, at step 3-4, the input/output terminal 610a, which is standing by for receipt of the input/output information transmission request at port number 65535, starts communicating with the information display terminal 810a, which transmitted the input/output information transmission request, in response to the input/output information transmission request transmitted at step 3-4, and transmits the input/output information (video) to the information display terminal 810a.

The information display terminal 810a that received the input/output information transmitted at step 3-4 displays the received input/output information on the input/output information display means at step 3-5.

Thus, viewing information of an input/output terminal is created using subordinate input/output information of the input/output terminal, and the viewing information of the input/output terminal made public by a WWW server can be viewed by any information display terminal. Furthermore, by designating an icon image of the input/output information of a specific input/output terminal contained in viewing information of input/output terminals, the input/output information of the designated input/output terminal can be displayed on the information display terminal.

Though this embodiment has been described in regard to an input/output terminal that is an input terminal for handling video, the terminal may be another input device or an output device such as a printer.

Further, though the icon contained in the viewing information in FIG. 12 of this embodiment utilizes an icon image that suggests a camera, a snapshot of the main input/output image acquired in advance may be displayed in the vicinity of the icon image.

It goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Thus, in accordance with the third embodiment as described above, viewing information of a plurality of input/output terminals connected via a general-purpose network is displayed on an information display terminal and one input/output terminal is designated from the viewing information, thereby making it possible to send and receive input/output information between the information display terminal and a specified input/output terminal.

In accordance with the third embodiment, information generated by a desired one of a plurality of information generating terminals can be verified in real-time.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus to output information of an information generating terminal to an output terminal via a network, comprising:

a communication device adapted to receive position status information of the information generating terminal, to update position information of the information generating terminal in a database in accordance with the received position status information, and to transmit geographic map information in accordance with the position information to an output terminal;

a search device adapted to search position information in the database in accordance with a request by said output terminal; and a display information generating device adapted to generate display information as the geographic map information, said display information including a geographic map corresponding to the position information searched from the database and an icon to be displayed on the geographic map, said icon representing the information generating terminal and a URL for accessing the information generating terminal being linked at the position of the icon, the position of the icon and the position of the URL linked thereto displayed on the geographic map being changed in accordance with the updated position information of the information generating terminal, wherein, said communication device transmits the geographic map information to the output terminal in response to the request from the output terminal, and wherein the output terminal displays the geographic map with the icon representing the information generating terminal, and the output terminal accesses the information generating terminal in response to a designation of the icon on the geographic map.

2. The apparatus according to claim 1, wherein the display information is transmitted to the output terminal with GET method of HTTP by said communication device.

3. A communication method for outputting information of an information generating terminal to an output terminal via a network, comprising the steps of:

receiving position status information of the information generating terminal;

updating position information of the information generating terminal in a database in accordance with the received position status information;

transmitting a geographic map information in accordance with the position information to an output terminal;

searching position information in the database in accordance with a request by the output terminal; and generating display information as the geographic map information, the display information including a geographic map corresponding to the position information searched from the database in the searching step and an icon to be displayed on the geographic map, the icon representing the information generating terminal and a URL for accessing the information generating terminal being linked at the position of the icon, the position of the icon and the position of the URL linked thereto displayed on the geographic map being changed in accordance with the updated position information of the information generating terminal, wherein the geographic map is transmitted to the output terminal in response to the request from the output terminal, and wherein the output terminal displays the geographic map with the icon representing the information generating terminal, and the output terminal accesses the information generating terminal in response to a designation the icon displayed on the geographic map.

4. The method according to claim 3, wherein the generated display information is transmitted to the output terminal with GET method of HTTP.

* * * * *

UNITED STATES PATENT AND TRADEMARK OFFICE
CERTIFICATE OF CORRECTION

PATENT NO. : 6,917,968 B2  Page 1 of 1
APPLICATION NO. : 09/161404
DATED : July 12, 2005
INVENTOR(S) : Nakamura It is certified that error appears in the above-identified patent and that said Letters Patent is hereby corrected as shown below:

ON THE COVER PAGE
(56) References Cited, U.S. PATENT DOCUMENTS, insert: --5,790,121 8/1998 Sklar et al.--

COLUMN 1
Line 42, "An" should read --A--;
Line 43, "An" should read --A--;
Line 58, "an" should read --a--; and
Line 62, "an" should read --a--.

COLUMN 2
Line 5, "an" should read --a--.

COLUMN 3
Line 55, "The" should read --the--.

COLUMN 5
Line 49, "an" should read --a--.

COLUMN 9
Line 29, "an" should read --a--.

Signed and Sealed this

Twenty-fourth Day of October, 2006

JON W. DUDAS
*Director of the United States Patent and Trademark Office*